(12) United States Patent
Acharya et al.

(10) Patent No.: US 11,501,010 B2
(45) Date of Patent: Nov. 15, 2022

(54) APPLICATION-PROVISIONING FRAMEWORK FOR DATABASE PLATFORMS

(71) Applicant: Snowflake Inc., Bozeman, MT (US)

(72) Inventors: Suraj Prakasha Acharya, Mountain View, CA (US); Damien Carru, New York, NY (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 16/883,565

(22) Filed: May 26, 2020

(65) Prior Publication Data

US 2021/0365577 A1 Nov. 25, 2021

Related U.S. Application Data

(60) Provisional application No. 63/027,625, filed on May 20, 2020.

(51) Int. Cl.
*G06F 21/62* (2013.01)
*H04L 9/40* (2022.01)

(52) U.S. Cl.
CPC ........ *G06F 21/6218* (2013.01); *G06F 21/629* (2013.01); *H04L 63/102* (2013.01)

(58) Field of Classification Search
CPC ... H04L 63/20; H04L 63/205; H04L 41/0893; H04L 63/10; H04L 63/102; H04L 63/101; H04L 67/125; G06F 21/604; G06F 21/6218; G06F 21/629
See application file for complete search history.

(56) References Cited

U.S. PATENT DOCUMENTS

| | | | |
|---|---|---|---|
| 6,209,036 B1* | 3/2001 | Aldred | G06F 16/958 709/229 |
| 6,560,618 B1* | 5/2003 | Ims | G06F 9/445 |
| 7,047,485 B1* | 5/2006 | Klein | G06F 16/9574 715/205 |

(Continued)

FOREIGN PATENT DOCUMENTS

| | | |
|---|---|---|
| CN | 113704247 | 11/2021 |
| ZW | 2022026973 | 2/2022 |

OTHER PUBLICATIONS

"U.S. Appl. No. 16/945,344, Examiner Interview Summary dated Dec. 7, 2020", 2 pgs.

(Continued)

*Primary Examiner* — Richard A McCoy
(74) *Attorney, Agent, or Firm* — Schwegman Lundberg & Woessner, P.A.

(57) ABSTRACT

In an embodiment, an application-provisioning framework of a database platform receives a provisioning request from a requesting entity, requesting provisioning of an application for a customer account of the database platform. In response to receiving the provisioning request, the application-provisioning framework retrieves, from data storage, an application-provisioning blueprint document that lists one or more database objects. The application-provisioning framework provisions, according to the retrieved application-provisioning blueprint document, the one or more listed database objects in a database associated in the database platform with the customer account.

24 Claims, 6 Drawing Sheets

(56) References Cited

U.S. PATENT DOCUMENTS

| | | | |
|---|---|---|---|
| 10,346,373 | B1 | 7/2019 | Kulshreshtha |
| 2001/0038624 | A1* | 11/2001 | Greenberg ............ H04L 61/157 370/352 |
| 2002/0128931 | A1* | 9/2002 | Himmel ................. G06Q 30/06 705/26.41 |
| 2003/0036919 | A1* | 2/2003 | Felt .................... G06Q 30/0601 718/101 |
| 2004/0055005 | A1* | 3/2004 | Creswell .................... G06F 8/71 719/315 |
| 2005/0091311 | A1* | 4/2005 | Lund .................. G08B 13/1968 709/203 |
| 2005/0091402 | A1 | 4/2005 | Satagopan et al. |
| 2005/0091658 | A1* | 4/2005 | Kavalam ................. G06F 21/31 718/104 |
| 2006/0053334 | A1* | 3/2006 | Ingen .................... G06F 9/4862 714/2 |
| 2006/0092938 | A1* | 5/2006 | Gentrix ................... H04L 29/06 370/390 |
| 2007/0000995 | A1* | 1/2007 | Sachdeva ............ G06F 9/44552 235/380 |
| 2007/0240134 | A1* | 10/2007 | Buragohain ........ G06F 9/44526 717/140 |
| 2008/0104212 | A1 | 5/2008 | Ebrom et al. |
| 2008/0120689 | A1* | 5/2008 | Morris .................. G06F 40/123 726/1 |
| 2009/0007162 | A1 | 1/2009 | Sheehan |
| 2010/0146584 | A1* | 6/2010 | Haswarey ............. G06F 21/604 726/1 |
| 2011/0106770 | A1 | 5/2011 | Mcdonald et al. |
| 2011/0106802 | A1* | 5/2011 | Pinkney ................ G06F 16/122 707/737 |
| 2011/0161988 | A1 | 6/2011 | Kashyap |
| 2012/0011512 | A1* | 1/2012 | Peckham ............ G06F 9/44521 718/100 |
| 2012/0110330 | A1* | 5/2012 | Dickgiesser .......... H04L 9/3271 713/168 |
| 2012/0278334 | A1* | 11/2012 | Abjanic .................. G06F 16/25 707/741 |
| 2013/0018890 | A1 | 1/2013 | Rajan et al. |
| 2013/0159349 | A1 | 6/2013 | Plantenberg et al. |
| 2016/0313934 | A1 | 10/2016 | Isherwood et al. |
| 2016/0373327 | A1 | 12/2016 | Degioanni et al. |
| 2017/0039242 | A1 | 2/2017 | Milton et al. |
| 2017/0041288 | A1 | 2/2017 | Stotski et al. |
| 2017/0339158 | A1* | 11/2017 | Lewis ................... H04L 63/205 |
| 2018/0041491 | A1 | 2/2018 | Gupta et al. |
| 2018/0314957 | A1 | 11/2018 | Kang et al. |
| 2019/0121543 | A1* | 4/2019 | Frolikov ................. G06F 3/064 |
| 2019/0303175 | A1* | 10/2019 | Irani ..................... G06F 16/951 |
| 2020/0042330 | A1* | 2/2020 | Lipke .................. G06F 9/45516 |
| 2020/0125652 | A1 | 4/2020 | Shilimkar et al. |
| 2020/0192592 | A1* | 6/2020 | Song ..................... G06F 9/5077 |
| 2020/0278933 | A1* | 9/2020 | Frolikov ............. G06F 12/1009 |
| 2020/0382442 | A1 | 12/2020 | Bantke et al. |
| 2021/0365437 | A1 | 11/2021 | Carru et al. |
| 2021/0365438 | A1 | 11/2021 | Carru et al. |
| 2022/0138184 | A1 | 5/2022 | Carru et al. |

OTHER PUBLICATIONS

"U.S. Appl. No. 16/945,344, Non Final Office Action dated Sep. 10, 2020", 33 pgs.

"U.S. Appl. No. 16/945,344, Response filed Dec. 9, 2020 to Non Final Office Action dated Sep. 10, 2020", 16 pgs.

"U.S. Appl. No. 16/945,344, Examiner Interview Summary dated Mar. 19, 2021", 3 pgs.

"U.S. Appl. No. 16/945,344, Final Office Action dated Dec. 21, 2020", 36 pgs.

"U.S. Appl. No. 16/945,344, Response filed Mar. 22, 2021 to Final Office Action dated Dec. 21, 2020", 15 pgs.

"U.S. Appl. No. 16/945,546, Non Final Office Action dated Jan. 6, 2021", 19 pgs.

Zuo, Qiong, et al., "Autonomous decentralized tenant access control model for sub-tenancy architecture in software-as-a-service (SaaS)", IEEE Twelfth International Symposium on Autonomous Decentralized Systems, (2015), 211-216.

Zuo, Qiong, et al., "Tenant-based access control model for multi-tenancy and sub-tenancy architecture in Software-as-a-Service", Frontiers of Computer Science 11, No. 3, (2017), 465-484.

"U.S. Appl. No. 16/945,344, Non Final Office Action dated Jun. 29, 2021", 40 pgs.

"U.S. Appl. No. 16/945,546, Advisory Action dated Jun. 28, 2021", 3 pgs.

"U.S. Appl. No. 16/945,546, Examiner Interview Summary dated Apr. 8, 2021", 3 pgs.

"U.S. Appl. No. 16/945,546, Examiner Interview Summary dated Jul. 15, 2021", 3 pgs.

"U.S. Appl. No. 16/945,546, Final Office Action dated Apr. 15, 2021", 21 pgs.

"U.S. Appl. No. 16/945,546, Response filed Apr. 6, 2021 to Non Final Office Action dated Jan. 6, 2021", 12 pgs "U.S. Appl. No. 16/945,546, Response filed Jun. 15, 2021 to Final Office Action dated Apr. 15, 2021", 11 pgs.

"U.S. Appl. No. 16/945,546, Response filed Jul. 15, 2021 to Advisory Action dated Jun. 28, 2021", 8 pgs.

Luning, Xia, et al., "An Administrative Model for Role-Based Access Control Using Hierarchical Namespace", Journal of computer research and development 44, No. 12, 2020, (2007).

"Indian Application Serial No. 202144018870, First Examination Report dated Feb. 15, 2022", 6 pgs.

"U.S. Appl. No. 16/945,344, Notice of Allowance dated Dec. 15, 2021", 8 pgs.

"U.S. Appl. No. 16/945,344, Supplemental Notice of Allowability dated Dec. 27, 2021", 5 pgs.

"U.S. Appl. No. 16/945,546, Examiner Interview Summary dated Feb. 2, 2022", 3 pgs.

U.S. Appl. No. 16/945,344, filed Jul. 31, 2020, Account-Level Namespaces for Database Platforms.

U.S. Appl. No. 16/945,546, filed Jul. 31, 2020, Namespace-Based System-User Access of Database Platforms.

"U.S. Appl. No. 16/945,546, Notice of Allowance dated Mar. 15, 2022", 10 pgs.

"U.S. Appl. No. 16/945,546, Response filed Feb. 18, 2022 to Non Final Office Action dated Oct. 18, 2021", 12 pgs.

"U.S. Appl. No. 17/647,915, Non Final Office Action dated Mar. 31, 2022", 13 pgs.

"U.S. Appl. No. 16/945,344, Examiner Interview Summary dated Oct. 1, 2021", 3 pgs.

"U.S. Appl. No. 16/945,344, Notice of Allowance dated Oct. 15, 2021", 8 pgs.

"U.S. Appl. No. 16/945,344, Response filed Sep. 29, 2021 to Non Final Office Action dated Jun. 29, 2021", 15 pgs.

"U.S. Appl. No. 16/945,546, Non Final Office Action dated Oct. 18, 2021", 22 pgs.

"International Application Serial No. PCT/US2021/070798, International Search Report dated Aug. 30, 2021", 2 pgs.

"International Application Serial No. PCT/US2021/070798, Written Opinion dated Aug. 30, 2021", 10 pgs.

\* cited by examiner

```
{
    "Application Name": "FRONTEND",
    "Vendor": "CompanyA",
    "Namespace": "Application",
    "Version": 1,
    "NotifyAppProvisioning": true,
    "AppSecurity": {
        "AppUsers": [
            {
                "Name": "FRONTEND_System_User",
                "ProvisioningSqlStatements": [
                    "CREATE USER IF NOT EXISTS FRONTEND_SYSTEM_USER;",
                    "CREATE SECURITY INTEGRATION IF NOT EXISTS FRONTEND TYPE=OAUTH...;",
                    "CREATE ROLE IF NOT EXISTS FRONTEND_CLIENT_ROLE;",
                    "GRANT ROLE FRONTEND_CLIENT_ROLE TO USER FRONTEND_SYSTEM_USER;"
                ]
            }
        ],
        "Databases": [
            {
                "Name": "FRONTEND",
                "ProvisioningSqlStatements": [
                    "CREATE DATABASE IF NOT EXISTS FRONTEND;",
                    "GRANT USAGE ON DATABASE FRONTEND TO ROLE FRONTEND_CLIENT_ROLE;"
                ]
            }
        ],...
```

FIG. 4

APPLICATION-PROVISIONING FRAMEWORK FOR DATABASE PLATFORMS

CROSS REFERENCE TO RELATED APPLICATIONS

This application claims the benefit of U.S. Provisional Patent Application No. 63/027,625, filed May 20, 2020 and entitled "APPLICATION-PROVISIONING FRAMEWORK FOR DATABASE PLATFORMS," the entirety of which is hereby incorporated herein by reference.

TECHNICAL FIELD

The present disclosure relates to databases and to applications that access databases. In some aspects, this disclosure relates more particularly to an application-provisioning framework for database platforms. In other aspects, the present disclosure relates more particularly to namespace system-user access of database platforms.

BACKGROUND

Database platforms are widely used for data storage and data access in computing and communication contexts. With respect to architecture, a database platform could be an on-premises database platform, a network-based database platform (e.g., a cloud-based database platform), a combination of the two, and/or include another type of architecture. With respect to type of data processing, a database platform could implement online transactional processing (OLTP), online analytical processing (OLAF), a combination of the two, and/or another type of data processing. Moreover, a database platform could be or include a relational database management system (RDBMS) and/or one or more other types of database-management systems.

In a typical implementation, a database platform includes one or more databases that are maintained on behalf of a customer account. Indeed, the database platform may include one or more databases that are respectively maintained in association with any number of customer accounts, as well as one or more databases associated with a system account (e.g., an administrative account) of the database platform, one or more other databases used for administrative purposes, and/or one or more other databases that are maintained in association with one or more other organizations and/or for any other purposes. A database platform may also store metadata in association with the database platform in general and in association with particular databases and particular customer accounts as well. Users and/or executing processes associated with a given customer account may, via one or more types of clients, be able to cause data to be ingested into the database, and may also be able to manipulate the data, add additional data, remove data, run queries against the data, and so forth.

In an implementation of a database platform, a given database (e.g., a database maintained for a customer account) may reside as a database object within, e.g., a customer account, which may include other database objects (e.g., users, roles, and/or the like) as well. Furthermore, a given database may itself contain one or more database objects such as schemas, tables, materialized views, and/or the like. A given table may be organized as a collection of records (e.g., rows) that each include a plurality of attributes (e.g., columns). In many implementations, database data is physically stored in multiple storage units, which may be referred to as files, blocks, micro-partitions, and/or by one or more other names. In many cases, a database on a database platform serves as a back end for one or more applications that are executing on one or more application servers, which often reside on an application infrastructure that is separate from an infrastructure of the database platform. A given application infrastructure may be associated with the database platform. For example, the database platform and the given application infrastructure may be managed by a common organization (e.g., a company). Other application infrastructures may be managed by other organizations.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 4 illustrates an example application-provisioning blueprint document, in accordance with at least one embodiment.

DETAILED DESCRIPTION

Figure 1:
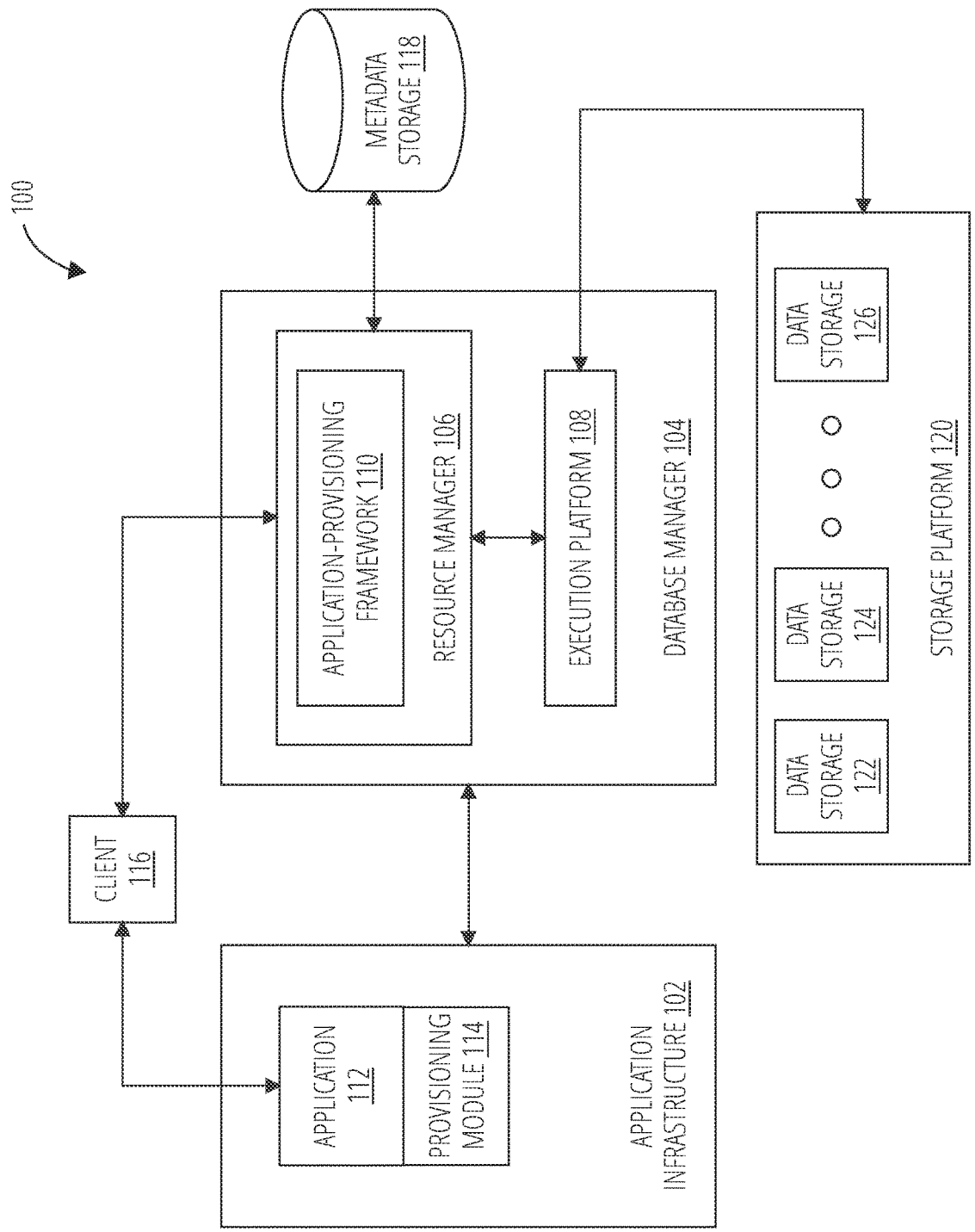
FIG. 1 illustrates an example database platform, in accordance with at least one embodiment.

In situations in which a customer uses an application to access a customer account that is maintained for that customer on a database platform, it is often the case that a number of database objects are provisioned in that customer account to facilitate the use of that application. Examples of database objects that are provisioned in such situations include users, roles for those users, privileges for those roles, databases, schemas, stages, and the like. In current implementations, when a customer associated with the example customer account requests to begin using an application that the customer was not previously using to access their data on the database platform, any associated database objects are manually provisioned by administrative users of the database platform. Moreover, a manual process is often undertaken to notify an executing instance of the application on an application infrastructure of the provisioning of these database objects for the customer account, so that the application can, in turn, conduct any necessary provisioning of its own. These manual processes are time-consuming, expensive, and prone to errors and inconsistencies.

To address these and other shortcomings of prior implementations, disclosed herein are various embodiments of an application-provisioning framework for database platforms. Indeed, some embodiments include an application-provisioning framework that, upon receiving a provisioning request specifying a given application and a given customer account, responsively provisions an instance of that application in that customer's account. This provisioning can include the creation of database objects such as one or more users, one or more roles for the one or more users, one or more privileges for the one or more roles, one or more databases, one or more schemas, one or more stages, and/or the like. Further examples of database objects that are provisioned in at least one embodiment are described herein. In some embodiments, the provisioning also includes creating a database object referred to herein as a namespace, within which one or more of the database objects are provisioned. A database object that represents the application itself may also be provisioned.

In some embodiments of the present disclosure, the provisioning of an application instance for a customer account includes retrieving, from data storage, a document referred to herein as an application-provisioning blueprint. This document is also referred to herein at times as a blueprint, a blueprint document, an application-provisioning blueprint document, and the like. Such a blueprint document may be maintained in the metadata storage of the database platform. A blueprint document may list one or more database objects to be created as part of the provisioning of a given application instance. The blueprint document may include instructions (e.g., SQL commands) that are executable to create the specified objects. In some embodiments, the application-provisioning blueprint document is a JavaScript Object Notation (JSON) document.

Moreover, the provisioning of an application for a customer account in accordance with embodiments of the present disclosure may further involve the application-provisioning framework transmitting application-provisioning data to an instance of the application that is executing on an application infrastructure that is separate from the database platform on which the application-provisioning framework is executing. In some instances, the application-provisioning framework transmits the application-provisioning data to a provisioning module of that instance of the application. The provisioning module may then set up one or more resources (e.g., users, roles, accounts, and/or the like) for the customer account, in accordance with the particular functioning of the application.

The automated nature of embodiments of the present disclosure save time as compared with the manual processes of prior implementations. Another advantage of embodiments of the present disclosure is that instances of applications that are provisioned by the application-provisioning framework are based on a common infrastructure and are provisioned in a similar if not identical way. This standardization makes maintenance of provisioned applications more consistent, more reliable, and less burdensome. Moreover, the database platform is able to securely communicate information about the provisioned objects to the application instance, which could be running on a different infrastructure.

Still another advantage of embodiments of the present disclosure is that the use of the application-provisioning blueprint documents for respective applications makes the present systems and methods extensible and reusable for a low marginal cost for each application that is added to the application-provisioning framework. The developer of a given application for which the application-provisioning framework has not yet been configured can simply upload an application-provisioning blueprint document for the given application to the system metadata. In some embodiments, rather than a developer uploading an application-provisioning blueprint document for a given application directly to the system metadata, the developer may instead upload such a blueprint document to an account in which the developer is testing the application; this approach may advantageously result in the developer's activity not affecting the larger system. In some such embodiments, once the blueprint document has been suitably tested and finalized, the developer triggers a workflow that uploads the finalized blueprint document to the system metadata. That final upload may trigger a review process that is to be completed prior to making the uploaded blueprint document operational in the overall system. In embodiments, fixture instantiations of provisioning for the given application will involve retrieving and following that blueprint document. Changes to the manner in which a given application will be provisioned going forward can be implemented by modifying a blueprint document and/or by uploading a replacement blueprint document to be used instead.

In addition to provisioning applications, the herein-disclosed application-provisioning framework can be used for other application-related functions such as deprovisioning applications from customer accounts, updating applications in customer accounts, upgrading applications in customer accounts, uninstalling applications from customer accounts, enabling (e.g., activating) applications in customer accounts, disabling (e.g., deactivating) applications in customer accounts, and/or the like. In some database-platform implementations, the application-provisioning framework may provide a single point of entry for taking such actions with respect to applications on an associated application infrastructure. There may be a separate blueprint document in system metadata for each such action for each such application. In some embodiments, there is a single blueprint document per application, and that single blueprint document contains all of the commands related to upgrading an application from the installed version to the latest version specified in the blueprint. In some implementations, there is no more than one blueprint document per application at a given time in the system metadata. In some such embodiments, when a given application is installed, the corresponding blueprint document is used for the provisioning related to that application, and the application version is set to the version specified in the blueprint document. When that application is later upgraded, the current version of the application may be upgraded to the version specified in the blueprint document.

One example embodiment takes the form of a first method that includes receiving, by one or more processors, a provisioning request from a requesting entity, requesting provisioning of an application for a customer account of a database platform. The first method also includes retrieving, by the one or more processors, an application-provisioning blueprint document from data storage in response to receiving the provisioning request. The application-provisioning blueprint document lists one or more database objects. The first method also includes provisioning, by the one or more processors and according to the retrieved application-provisioning blueprint document, the one or more listed database objects in the customer account.

As described more fully below, also disclosed herein are various embodiments of namespace system-user access of database platforms. One such example embodiment takes the form of a second method, performed by one or more processors, that includes authenticating a system user with a database that is associated in a database platform with a customer account, where the system user is a programmatic user that is not associated with a user account of the customer account, where the system user resides as a first database object in a first namespace, and where the first namespace is distinct from a default namespace of the customer account. The second method also includes sending, as the system user, a query to the database, as well as receiving, by the system user, results of the query from the database. The second method also includes storing, by the system user, the results of the query in a first-namespace stage, which resides as a second database object in the first namespace.

Another embodiment takes the form of a system (e.g., a database platform) that includes at least one processor, and that also includes one or more computer-storage media containing instructions executable by the at least one processor for causing the at least one processor to perform at least the operations that are listed in either or both of the two preceding paragraphs. Still another embodiment takes the form of one or more computer-storage media containing instructions executable by at least one processor (of, e.g., a database platform) for causing the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a database-platform embodiment), a computer-storage-medium embodiment, and/or one or more other types of embodiments. Furthermore, this flexibility and cross-applicability of embodiments is present in spite of the use herein of any slightly different language (e.g., processes, methods, methodologies, steps, operations, functions, and/or the like) to describe and/or characterize such embodiments and/or any element or elements thereof.

FIG. 1 illustrates an example database platform 100, in accordance with at least one embodiment. In various embodiments, the database platform 100 may be used for performing one or more of the operations of one or more of the methods (including processes and the like) disclosed herein. As shown in FIG. 1, the database platform 100 includes a database manager 104, which includes a resource manager 106 and an execution platform 108. The database manager 104 need not be a defined physical device, though it could be, but in general is used herein as shorthand to refer to the combination of the resource manager 106 and the execution platform 108. As discussed in more detail below, the resource manager 106 includes an application-provisioning framework 110. The execution platform 108 may include one or more execution nodes (e.g., servers, workers, threads, and/or the like). A grouping of execution nodes in the execution platform 108 may be referred to as a virtual warehouse, and such virtual warehouses are, in some embodiments, dynamically resizable to meet changing demands. Also depicted in FIG. 1 are an application infrastructure 102, a client 116, a metadata storage 118, and a storage platform 120.

Any one or more of the components, devices, systems, and/or the like that are depicted in FIG. 1 and in any of the other figures could be implemented as one or more computing devices having an architecture that is similar to the example computing device 600 that is described below in connection with FIG. 6. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations).

In some embodiments, all of the entities that are depicted in FIG. 1 are part of what is referred to herein as the database platform 100, though this is not the case for all embodiments. For example, in at least one embodiment, the database platform 100 does not include the client 116. As another example, in some embodiments, the database platform 100 does not include the application infrastructure 102. As yet another example, in some embodiments, the database platform 100 does not include the storage platform 120. In the embodiments that are primarily described herein, the database platform 100 includes the database manager 104 (including the resource manager 106 and the execution platform 108), the metadata storage 118, and the storage platform 120, and does not include the application infrastructure 102 or the client 116. The application infrastructure 102 is, however, in the embodiments that are primarily described herein, associated with—e.g., managed by a common organization as the database manager 104. This is by way of example and not limitation, as it is the case in some embodiments that the application infrastructure 102 and the database manager 104 are not managed by a common organization.

The resource manager 106 may be configured to manage a number of different types of tasks including external database tasks (e.g., query requests) that are received from, e.g., one or more clients such as the client 116. The resource manager 106 may be coupled to any number of clients, although only one is depicted by way of example in FIG. 1. The client 116 may facilitate end users making data-storage and/or data-retrieval requests, system administrators managing the database platform 100, and/or the like. In various different embodiments, the client 116 could be a web-interface client, a desktop application, a mobile app, a Java Database Connectivity (JDBC) client, an Open Database Connectivity (ODBC) client, and/or another type of client. As shown in FIG. 1, the client 116 may communicate with both the application infrastructure 102 (e.g., the application 112) and the database manager 104 (e.g., the resource manager 106).

As depicted in FIG. 1, the resource manager 106 is coupled to the metadata storage 118, which in an embodiment is associated with the data stored throughout the database platform 100. In some embodiments, the metadata storage 118 includes a summary of data stored in remote data-storage systems (such as the storage platform 120) as well as data available in a local cache (of, e.g., the resource manager 106 and/or the execution platform 108). Additionally, the metadata storage 118 may include information regarding how data is organized in remote data-storage systems and/or in local caches. Among other uses, the metadata storage 118 may allow systems and services to determine whether a given quantum of data needs to be processed (in connection with, e.g., a given query) without loading or accessing the actual data from a storage device.

The resource manager 106 is further coupled to the execution platform 108, which may provide multiple computing resources that execute various data-storage and/or data-retrieval tasks. In at least one embodiment, the resource manager 106 includes a layer of code (e.g., Java code) that is global with respect to the database platform 100, where that code layer includes instructions for performing functions such as compiling queries and brokering requests to one or more execution nodes in the execution platform 108. In some embodiments, there exists one or more instances of the execution platform 108 used for executing client tasks, such as database queries and/or internal database tasks such as updating metadata, clustering tables, generating materialized views, and the like. In some such embodiments, there also exists one or more instances of the execution platform 108 used for feature development and/or testing, and each such instance of the execution platform 108 may be separate from each client instance of the execution platform 108, such that, for example, client-job processing is not impacted by feature-development tasks. Other arrangements are possible as well.

The execution platform 108 may be coupled to multiple data-storage devices such as one or more of a data-storage device 122, a data-storage device 124, and a data-storage device 126 that are part of the storage platform 120. Although three data-storage devices are shown in FIG. 1, the storage platform 120 may include—and the execution platform 108 may be capable of communicating with—any number of data-storage devices. In some embodiments, one or more of the data-storage device 122, the data-storage device 124, and the data-storage device 126 are cloud-based storage devices that are located in one or more geographic locations. For example, one or more of the data-storage device 122, the data-storage device 124, and the data-storage device 126 may be part of a public cloud infrastructure or a private cloud infrastructure. One or more of the data-storage device 122, the data-storage device 124, and the data-storage device 126 may be or include hard disk drives (HDDs), solid state drives (SSDs), storage clusters and/or any other data-storage technology. In some examples, the storage platform 120 includes distributed file systems (such as Hadoop Distributed File Systems (HDFSs)), object storage systems, and/or the like.

As shown in FIG. 1, the storage platform 120—including the data-storage device 122, the data-storage device 124, and the data-storage device 126—is decoupled from the computing resources associated with the execution platform 108, the resource manager 106, and the database manager 104 generally. In an embodiment, each of a plurality of database-platform deployments includes a respective storage platform 120 having its own respective multiple data-storage devices. This architecture supports dynamic changes to the database platform 100 based on changing data-storage and/or data-retrieval needs, as well as changing needs of users and systems accessing the database platform 100. The support of dynamic changes allows the database platform 100 to scale quickly in response to changing demands on the systems and components within the database platform 100. The decoupling of the computing resources from the data-storage devices supports the storage of large amounts of data without requiring a corresponding large amount of computing resources. Similarly, this decoupling supports a significant increase in the computing resources utilized at a particular time without requiring a corresponding increase in data-storage resources.

In particular embodiments, any one or more of the communication links depicted in FIG. 1 could be implemented via one or more data-communication networks, which may utilize any communication protocol and any type of communication medium. In some embodiments, the data-communication networks are a combination of two or more data-communication networks (or sub-networks) coupled to one another. In various different embodiments, these communication links are implemented using any type of communication medium and any communication protocol.

As a general matter, in at least some embodiments, the database platform 100 can be referred to using terms such as a cloud-based data warehouse, a network-based data warehouse, or simply a data warehouse. A cloud-based data warehouse is one type of network-based data system that can be used for data analysis and reporting and that includes a central repository of integrated data from one or more disparate sources. A cloud-based data warehouse is commonly an OLAP database that can store current and historical data that can be used for creating analytical reports for an enterprise based on data stored within databases of the enterprise. To this end, data warehouses often provide business-intelligence tools, tools to extract, transform, and load data into the repository, and tools to manage and retrieve metadata, among other examples. There are other types of cloud-based data warehouses, such as OLTP databases, as well as data systems that operate with characteristics of multiple types of database systems.

The application-provisioning framework 110 may be programmed to perform one or more of the methods described herein. As depicted in FIG. 1, the application-provisioning framework 110 may be a functional component of the resource manager 106. In some embodiments, the application-provisioning framework 110 is implemented as a stand-alone component in communication with one or more entities such as the application infrastructure 102, the resource manager 106, the execution platform 108, the client 116, the metadata storage 118, and/or the like.

The application infrastructure 102 may be a system of one or more servers, and is depicted as including only a single executing application: the application 112. In various different implementations, the application infrastructure 102 could include any number of executing applications, and these applications could be of any type. In the embodiments that are primarily described herein, the application 112 is a user-interface application that serves as a front end for clients such as the client 116 to use in accessing the database platform 100. Another type of application that could be executing on the application infrastructure 102 is an alerts application, configured to monitor various values, tables, databases, and/or the like in the database platform 100, and to provide alerts to one or more clients when specified conditions are met. Numerous other types of applications could be executing on the application infrastructure 102 as well.

As depicted in FIG. 1, in at least one embodiment, the application 112 has an associated provisioning module 114. In various different embodiments, the application 112 may use the provisioning module 114 to provision various objects (e.g., users, roles, and/or the like) for the application 112. In some examples, when provisioning a customer account to be able to use the application 112, the application-provisioning framework 110 communicates with the provisioning module 114. This connection can be initiated by either side—e.g., by either the application-provisioning framework 110 or the provisioning module 114. In at least one embodiment, the application-provisioning framework 110 communicates, to the application 112 and/or the provisioning module 114, information about one or more data objects (e.g., credentials, identifiers, and/or the like) that have been provisioned in the customer account 200. This information may facilitate the application 112 and/or the provisioning module 114 being able to create and/or configure one or more objects in the application infrastructure 102 for the newly provisioned application. Thus, in at least one embodiment, the application-provisioning framework 110 transmits application-provisioning data (regarding and/or including, e.g., user credentials, identifiers, and/or the like) to the provisioning module 114 for use by the provisioning module 114 in provisioning resources at the application 112 for the customer account to be able to use the application 112. Examples of such communications are described more fully below.

Moreover, the application infrastructure 102 could also include an entity (not pictured) that implements perimeter protection for the application infrastructure 102 and that may provide additional functions such as serving as a hypertext transfer protocol (HTTP) reverse proxy, managing incoming connections from browsers and/or apps, and/or the like. Such an entity may also perform load-balancing functions among other possible functions. The entity may integrate with applications in the application infrastructure to provide single sign-on (SSO) functionality.

Figure 2:
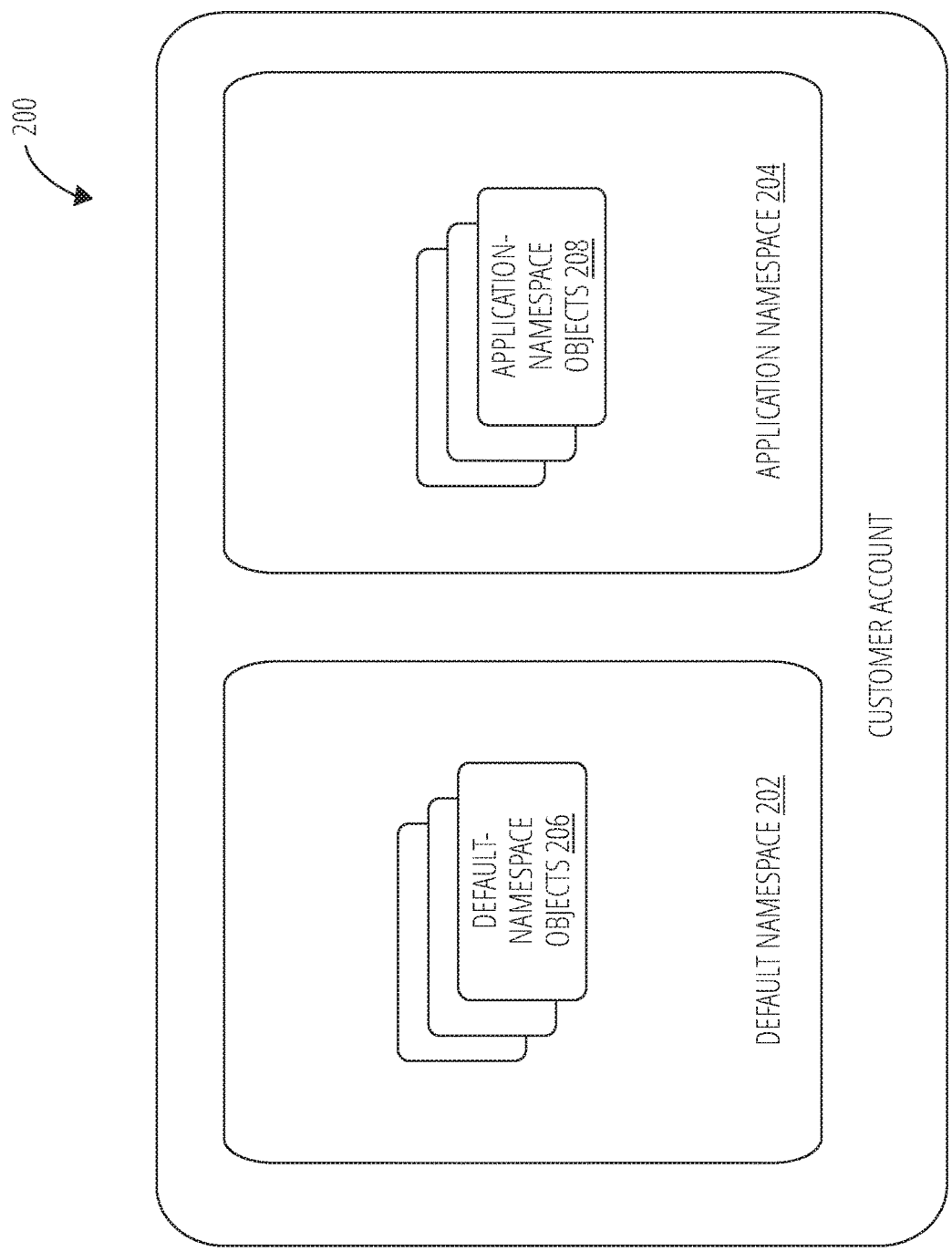
FIG. 2 illustrates an example customer account, in accordance with at least one embodiment.

FIG. 2 illustrates an example customer account 200, in accordance with at least one embodiment. The database platform 100 (e.g., the database manager 104) may maintain the customer account 200 for a given customer of the database platform 100. The customer account 200 could be maintained in one or more storage devices of the storage platform 120. Moreover, the database manager 104 may maintain metadata associated with the customer account 200 in the metadata storage 118. In some instances, the database platform 100 maintains numerous customer accounts for numerous respective customers of the database platform 100.

As depicted in FIG. 2, in some embodiments, the customer account 200 includes multiple database objects that are referred to in this disclosure as namespaces. In the example that is shown in FIG. 2, the customer account 200 includes a default namespace 202 and an application namespace 204. The default namespace 202 may include one or more default-namespace objects 206, while the application namespace 204 may include one or more application-namespace objects 208. Any database object in the default-namespace objects 206 and any database object in the application-namespace objects 208 could be any type of database object, with some examples including users, roles, privileges, stages, and the like. Moreover, the customer account 200 could include any number of namespaces, including any number of temporary namespaces that may be respectively associated with database sessions engaged in by one or more users in the customer account 200.

In at least one embodiment, a given one of the default-namespace objects 206 and a given one of the application-namespace objects 208 could be given the same name without causing conflict, since the database manager 104 may be configured to set a given namespace as a current context for a given user and resolve object names within the current context (i.e., within the current namespace). Thus, in such embodiments, an advantage of using namespaces in the manner described herein in connection with embodiments of the present disclosure is that name collisions are avoided. Thus, in such embodiments, a developer of a given application can choose names for provisioned database objects listed in the associated blueprint document without having to be concerned with the possibility of name collisions with database objects that exist in the customer account 200 but external to the application namespace 204 (e.g., database objects that exist in the default namespace 202).

Furthermore, in some embodiments, the database platform 100 implements application namespaces on a per-application-vendor basis. In such embodiments, if a given application vendor implemented multiple applications in their respective vendor-specific application namespace, then database objects in that vendor-specific application namespace would be visible across those multiple applications. An organization that manages both the application infrastructure 102 and the database manager 104 could be considered to be an application vendor. In some embodiments, application namespaces are implemented on a per-application basis. In some such embodiments, database objects within a given application namespace would only be visible to the single application associated with that given application namespace, depending on the privileges granted or not granted to users defined outside of that example application namespace.

Moreover, in at least one embodiment, the one or more default-namespace objects 206 in the default namespace 202 are visible to the associated customer whereas the one or more application-namespace objects 208 in the application namespace 204 are not visible to the customer. For example, the one or more default-namespace objects 206 in the default namespace 202 may be visible to the client 116, whereas the one or more application-namespace objects 208 in the application namespace 204 may not be visible to the client 116. In at least one embodiment, a namespace-usage privilege is defined such that, e.g., a user having been granted a role that itself has been granted the namespace-usage privilege on a given namespace would have visibility to data objects that are defined in that given namespace. Returning to the present example, in embodiments in which the one or more default-namespace objects 206 in the default namespace 202 are visible to the client 116 and in which the one or more application-namespace objects 208 in the application namespace 204 are not visible to the client 116, database objects (i.e., the application-namespace objects 208) can be provisioned by the application-provisioning framework 110 in the application namespace 204, and those database objects remain not visible to the customer, not visible to the client 116, and not visible to the default-namespace objects 206 in the default namespace 202. In some embodiments, all of the database objects that the application 112 uses in connection with the customer account 200 are defined in the application namespace 204; that is, in some embodiments, the application 112 does not access any database objects that are defined in the customer account 200 other than the application-namespace objects 208, which are defined in the application namespace 204.

In some embodiments, the application namespace 204 is represented as a namespace object in the customer account 200. In some such embodiments, that namespace object is not visible to the customer. This namespace object may be created and owned by a role that is referred to herein as the app-admin role, which is an administrative role with respect to the application 112 and the application namespace 204 in the described examples. The app-admin role may be defined within the application namespace 204 to, among other benefits, avoid name collisions with any roles defined outside of the application namespace 204 (e.g., in another namespace such as the default namespace 202). In at least some embodiments, the app-admin role is not owned by an administrative role that exists for the customer in the customer account 200 (e.g., in the default namespace 202). Indeed, in some embodiments, the app-admin role is not even visible to the default namespace 202, though this is not required. A support function may be implemented such that the app-admin role can be temporarily granted to the customer's administrative role in instances in which the customer needs to, e.g., address an issue that requires the access usually reserved for the app-admin role. As a general matter, making the app-admin role (and the application namespace 204 generally) not visible to the default namespace 202 can help to protect one or more of the application-namespace objects 208 such as configuration tables and the like, where changes to such objects could have unintended and undesired consequences to the customer account 200. For example, some such changes could leave the customer account 200 in an unstable state.

Figure 3:
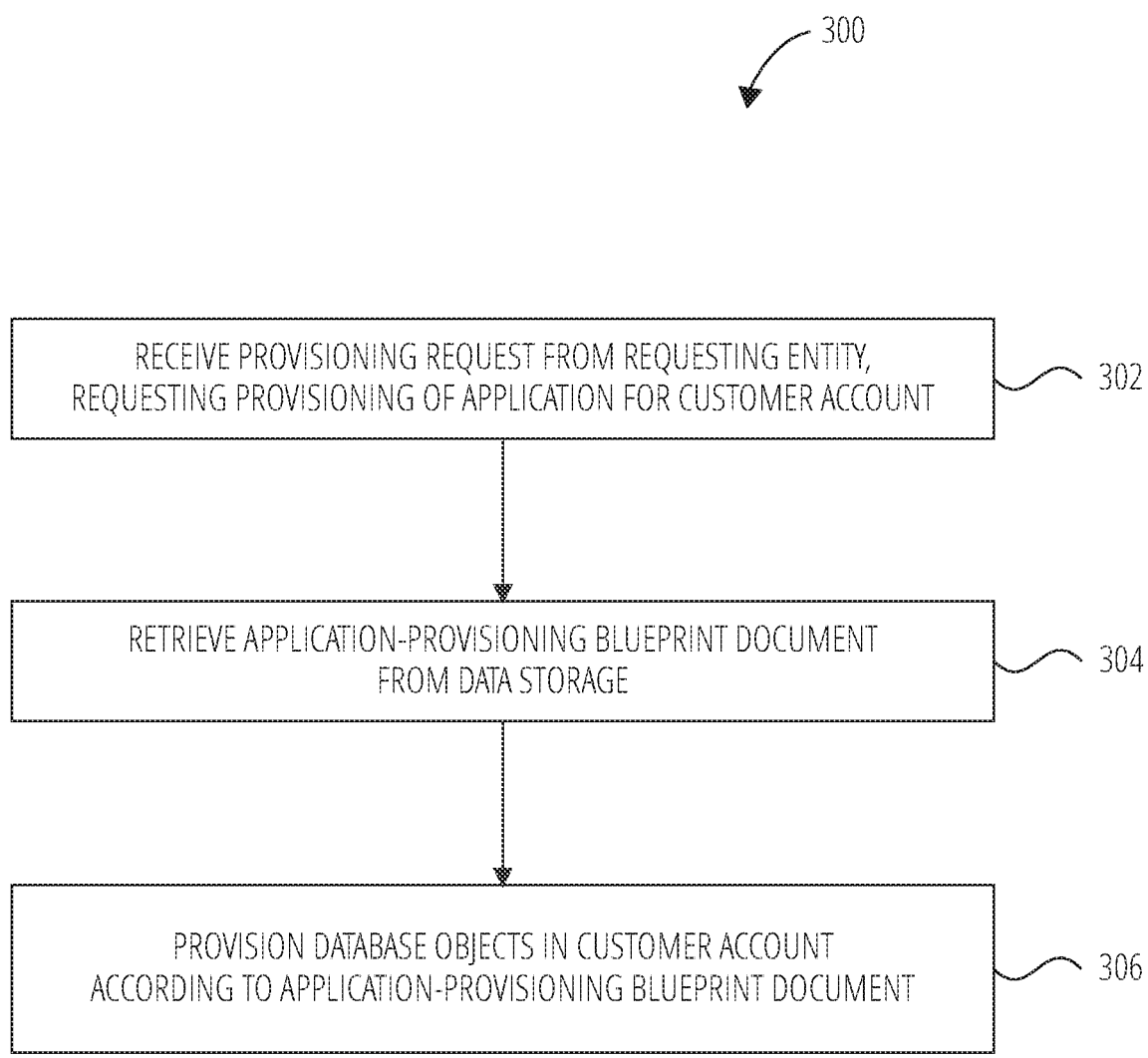
FIG. 3 illustrates a first example method, in accordance with at least one embodiment.

FIG. 3 illustrates an example method 300, in accordance with at least one embodiment. In various different embodiments, the method 300 could be performed by any computing and communication device or system of such devices that is suitably equipped, programmed, and configured to perform the operations described herein. In at least one embodiment, the various operations of the method 300 are performed by one or more processors. In some embodiments, all or part of the method 300 is performed by the database manager 104, which may involve one or more aspects of the method 300 being performed by the resource manager 106, one or more aspects of the method 300 being performed by the execution platform 108, and/or one or more aspects of the method 300 being performed by one or more other functional components of the database manager 104. By way of example and not limitation, the method 300 is described below as being performed by the application-provisioning framework 110, and this description makes reference by way of example to other elements depicted in FIG. 1 and FIG. 2.

At operation 302, the application-provisioning framework 110 receives a provisioning request from a requesting entity, requesting provisioning of the application 112 for the customer account 200, which is a customer account of the database platform 100. In some cases, the requesting entity is the client 116, and is associated with a user account of a user that is associated with the customer account 200. As an example, a user could be logged in to a web interface. In other examples, the client 116 is or includes an executing process, which may be an executing process that is associated with the customer account 200, a system (e.g., administrative) process executing on the database platform 100, and/or the like. In at least one embodiment, the requesting entity may be checked by the application-provisioning framework 110 or another part of the database platform 100 to make sure that the requesting entity has the appropriate privilege or privileges to be granted such a request. In some cases, the requesting entity is a system instance of the application that is also executing as the application 112 on the application infrastructure 102. In such cases, the system instance of that application may be executing in an administrative account of the database platform 100. In some such examples, the system instance of the application sends the provisioning request in response to creation of the customer account 200 at the database platform 100.

At operation 304, the application-provisioning framework 110 retrieves an application-provisioning blueprint document from data storage (e.g., from the metadata storage 118) in response to receiving the provisioning request at operation 302, where the application-provisioning blueprint document lists one or more database objects, which may be database objects that are to be provisioned for use in connection with the requested application in the customer account 200. Those one or more database objects could include one or more application-specific users, one or more application-specific roles for the one or more application-specific users and/or for one or more other users, one or more privileges for the one or more application-specific roles and/or one or more other roles, one or more application-specific stages, one or more application-specific schemas, one or more application-specific databases, and/or one or more of any other types of database objects.

In at least one embodiment, the schema of a database is its structure described in a formal language supported by the database management system (DBMS) (e.g., the database platform 100). Thus, a schema may indicate how a given database is constructed (e.g., divided into database tables in the case of relational databases). In at least one embodiment, databases include schemas and schemas include stages. In at least one embodiment, a stage is an abstraction or representation of a data-storage unit within which a customer may be able to store data (e.g., incoming data to import into a database, outgoing data to export from a database, and/or the like). In an embodiment, a stage corresponds to an Amazon Web Services (AWS) S3 storage bucket, just as an example.

An example application-provisioning blueprint document 400 is shown in FIG. 4. As mentioned above, the application-provisioning blueprint document 400 could be a JSON document, which could contain (e.g., SQL) instructions to be executed by the application-provisioning framework 110. Other types of documents (e.g., eXtensible Markup Language (XML) documents) could be used instead of or in addition to JSON documents. In some embodiments, the application-provisioning framework 110 supports multiple formats, languages, and/or protocols for application-provisioning blueprint documents.

As shown, the application-provisioning blueprint document 400 specifies an example application name of "FRONTEND," which is used herein by way of example to represent an example application that could serve as a front-end user interface via which users can access data associated with a corresponding customer account in the database platform 100. In this example description, the application FRONTEND represents the application 112. The application-provisioning blueprint document 400 also lists an example vendor ("CompanyA"), an example namespace ("Application") (that, in this example, is the application namespace 204) into which the requested database objects are to be provisioned, and an example version ("1") of the example application 112.

The application-provisioning blueprint document 400 further specifies that an example Boolean variable named "NotifyAppProvisioning" is set to "true," which indicates to the application-provisioning framework 110 that it will be notifying an application-provisioning module (i.e., the provisioning module 114) of the requested application 112 in connection with the requested provisioning. That notification is described more fully below.

The example application-provisioning blueprint document 400 next includes a section named "AppSecurity" that includes a subsection named "AppUsers" in which the creation of a system user is specified. In this example, the requested system user is to be named "FRONTEND_System_User" and may be referred to in this description as the system user, the FRONTEND system user, and the like. The "AppUsers" section includes four SQL statements in a subsection named "ProvisioningSqlStatements." The first SQL statement creates the FRONTEND system user. The second SQL statement creates a security integration (e.g., an OAuth integration) named "FRONTEND." The third SQL statement creates a role named "FRONTEND_CLIENT_ROLE," which may be the aforementioned app-admin role. The fourth SQL statement grants the role FRONTEND_ CLIENT_ROLE to the just-created system user. It is contemplated that any number of system users, roles, privileges, security integrations, and/or the like could be specified for creation by a given blueprint document.

The next section of the application-provisioning blueprint document 400 is named "Databases," and includes statements that create a database named "FRONTEND." The "Databases" section further includes a subsection named "ProvisioningSqlStatements" that includes two SQL statements. The first SQL statement creates the database named "FRONTEND" and the second SQL statement grants a usage privilege on that newly created database to the role "FRONTEND_CLIENT_ROLE," which was created by the third SQL statement above and granted to the system user by the fourth SQL statement above. Thus, the granting of the usage privilege to that role grants the usage privilege to the system user so long as the system user has that role. It is contemplated that any number of databases, schemas, stages, and/or the like could be specified for creation by a given blueprint document such as the application-provisioning blueprint document 400. It is further contemplated that formats other than JSON documents may be used instead or in addition, and that data manipulation languages (DMLs) other than SQL may be used instead or in addition.

In some embodiments, a blueprint document may also include one or more executable instructions that grant what are referred to here as bootstrap privileges. These instructions may be a set of SQL statements that grant privileges on the customer's data and/or objects to preexisting users. These users may be in the default namespace 202. A blueprint document could also create users and/or provision other objects in other namespaces such as the default namespace 202.

A given blueprint document could include an executable statement or set of statements that checks whether another application (other than the one being provisioned) has already been provisioned in the customer's account. If the answer is yes, the provisioning may proceed. If the answer is no, the provisioning process may be terminated and an error message returned to the requesting entity. Thus, it is contemplated that there may be dependencies (e.g., installation and/or provisioning prerequisites) among applications reflected in one or more blueprint documents.

Moreover, in some embodiments, a development mode may be enabled in which a developer, for testing and/or debugging purposes as examples, can pass a blueprint document as a parameter in a request that the application be provisioned by the application-provisioning framework 110. This may be for testing and/or debugging in the developer's own account on the database platform.

Returning to FIG. 3, at operation 306, the application-provisioning framework 110 provisions, according to the retrieved application-provisioning blueprint document 400, the one or more listed database objects in the customer account 200 in the database platform 100. In the example being described in connection with the example application-provisioning blueprint document 400, the application-provisioning framework 110 executes the above-described SQL statements to create four database objects: a system user named "FRONTEND_SYSTEM_USER," a security integration named "FRONTEND," a role named "FRONTEND_ CLIENT_ROLE," and a database named "FRONTEND." Note that in the described embodiments, database objects of different types (e.g., users, roles, databases, etc.) in a given namespace may have matching names (e.g., the aforementioned application object, security-integration object, and database object that are all named "FRONTEND") without causing name collisions, as the database platform 100 may distinguish among objects based on type when conducting name resolution of objects. The application-provisioning framework 110 also executes two grants that are listed in the application-provisioning blueprint document 400: the first is a grant of the role FRONTEND_CLIENT_ROLE to the system user FRONTEND_SYSTEM_USER, and the second is a grant of a usage privilege to the role FRONTEND_CLIENT_ROLE on the database FRONTEND.

With respect to database objects, depending on the instructions in a given blueprint, the application-provisioning framework 110 may provision one or more database objects in the application namespace 204, one or more database objects in the default-namespace objects 206, and/or one or more database objects in one or more other namespaces. In the current example, all four created objects are in the application namespace 204. Additionally, in some embodiments, the application-provisioning framework 110 may provision a database object that represents the application 112 itself. This type of database object is referred to herein as an application object.

The application-provisioning framework 110 may thus provision an application object in the application namespace 204. This particular object, in addition to representing the application instance in the customer account 200, may include information about the application 112 (e.g., name, vendor, version number (or other version designation), and/or the like) as well as information regarding the other database objects created in the customer account 200 for that application. Thus, an application object is a meta-object of sorts with respect to the application 112 that is being provisioned for the customer account 200. If multiple applications are provisioned by the application-provisioning framework 110 in the customer account 200, each such application may be represented by a respective application-type database object in the customer account 200. Each such application object may have a status property that can be set to, for example, active or inactive for when the application is enabled or disabled, respectively. That property may be visible to the customer account 200. Additional properties of the application object that may not be visible to the customer account 200 could include database objects (e.g., system users, roles, privileges, databases, etc.) that are provisioned for the application instance.

In some embodiments, in between operation 304 and operation 306, i.e., prior to provisioning one or more database objects according to the application-provisioning blueprint document 400, the application-provisioning framework 110 may present one or more grant commands to an authorized user and/or entity (e.g., an administrator of the customer account 200). For example, the application-provisioning framework 110 may generate a script that includes one or more grant commands associated with the provisioning of the application, transmit the script to the authorized entity, and receive an indication from the requesting entity that the one or more grant commands have been executed. In various different embodiments, the authorized entity could be an administrator of the customer account 200, the client 116, or any other entity authorized to approve the one or more grants in the script. This process flow could give a customer user account control over granting privileges, roles, and/or the like with respect to objects and/or data owned by (e.g., under the control of) the associated customer. For example, this process flow could give a customer account control over granting one or more privileges to one or more roles, granting one or more roles to one or more users, and/or the like. The script could be or include a set of SQL statements for the authorized user and/or entity to execute.

In some embodiments, this functionality is performed by the application-provisioning framework 110 using a user-defined function (UDF). Thus, for example, if a given blueprint document specifies that a customer is to be prompted to grant certain privileges on the customer's database objects to certain roles, the application-provisioning framework 110 may create a UDF and then grant usage on the UDF to the current primary role of the current user. The application-provisioning framework 110 may then return, to the user, the UDF to be executed. When the user executes the UDF, the following may occur: privileges may be granted to roles per the UDF, and then the application-provisioning framework 110 may delete the UDF and resume provisioning operations. In some cases, a status property of an associated application object may be set to SUSPENDED or the like when the UDF has been sent to the user and has yet to be executed, and the status property may be set to RESUMED or the like after the UDF has been executed. During these steps and/or at other times, a given user could check the status of the provisioning of the application by issuing a command to describe the application object, which in at least one embodiment contains the aforementioned status property.

As described above, the application 112 may reside as an application instance on the application infrastructure 102, which may be separate from an infrastructure of the database platform 100. Moreover, performing operation 306 may include transmitting application-provisioning data associated with the customer account 200 to the application 112 on the application infrastructure 102. In some cases, this involves transmitting the application-provisioning data to the provisioning module 114 that is associated with the application 112. The transmission of the application-provisioning data to the provisioning module 114 (or more generally to the application 112) is also referred to herein as sending or making a notification to the provisioning module 114 of the provisioning of the application 112 in the customer account 200. The application-provisioning data could include credentials for one or more users such as the above-described system user and/or one or more application users in the default namespace 202. The application-provisioning data may instead or in addition include one or more other objects, values, parameters, and/or the like. The provisioning module 114 may then use the provided application-provisioning data to provision appropriate resources at the application 112 to complement the provisioning done by the application-provisioning framework 110 in the database platform 100. In response to receiving the application-provisioning data, the provisioning module 114 may take steps such as initializing an HTTP server for the customer to use in connection with using the application 112. Another possible step is that the provisioning module 114 may initialize one or more stages in, e.g., a cloud-storage service separate from the database platform 100.

In some implementations, the application-provisioning framework 110 includes a message repository (e.g., an outbox) that the provisioning module 114 may poll on a periodic basis to check for new messages. As part of provisioning the application 112 for the customer account 200, the application-provisioning framework 110 may place a corresponding message in that message repository, and the provisioning module 114 may pick up that message on an ensuing check. That message could include data identifying the application 112, an account identifier associated with the customer account 200, credentials of one or more users (e.g., a system user), and/or the like. In other implementations, the application-provisioning framework 110 may send the application-provisioning data to the provisioning module 114 in response to receiving a polling message from the provisioning module 114, which may be configured to send such polling messages periodically. Moreover, at regular time intervals and/or upon reaching one or more milestones (e.g., successful provisioning), the provisioning module 114 may transmit a provisioning-status report to the application-provisioning framework 110.

Another function that the application-provisioning framework 110 could perform according to instructions set forth in a given blueprint document is that the application-provisioning framework 110 could itself provision one or more instances of one or more resources with one or more (e.g., third-party) systems external to the application-provisioning framework 110. As an example, the application-provisioning framework 110 could request provisioning of one or more stages (e.g., one or more AWS S3 stages), one or more HTTP servers, one or more notification services, and/or the like. The application-provisioning framework 110 may also be configured to return one or more application-provisioning status messages to the requesting entity. Each such application-provisioning status message could convey success, failure, current status of the provisioning of the application 112 in the customer account 200, and/or the like.

After the herein-described provisioning process for the application 112 in the customer account 200 has been performed by the application-provisioning framework 110, at least two different types of users may use the application 112 to access the customer's data that is stored in the storage platform 120 in connection with the customer account 200. These two types are referred to herein as human users and the above-described system users.

A user object associated with a human user may reside in the default namespace 202. When accessing the database platform 100 via the application 112, the user may engage in what is known as a 3-legged authentication flow using, e.g., OAuth. In this 3-legged authentication flow, which may also be referred to as an SSO flow, the user accesses the application 112. The application 112 may then redirect the user to the database platform 100, which may prompt the user to provide the user's credentials and in return provide the user (e.g., the client 116) with a code. The database platform 100 may then redirect the client 116 back to the application 112, at which point the client 116 may provide that code to the application 112. The application 112 may then provide that code as well as the credentials (e.g., user identifier and password or other secret) of the user to the database platform 100, which may then return an access token (e.g., an OAuth Access Token) to the application 112. The application 112 may then use that access token to open a connection with the database platform 100, which may then issue a session token to the application 112, where that session token has the identity of the user embedded in it. The application 112 may then use that session token to access the database platform 100 during the associated session, which the database platform 100 may bind to the user identity and therefore to the default namespace 202 in which that user object was defined. If the user object for that user is defined in a different namespace, the database platform 100 may bind the session to that namespace instead. During the session, the user may, via the client 116, issue queries, receive results, and the like.

Figure 5:
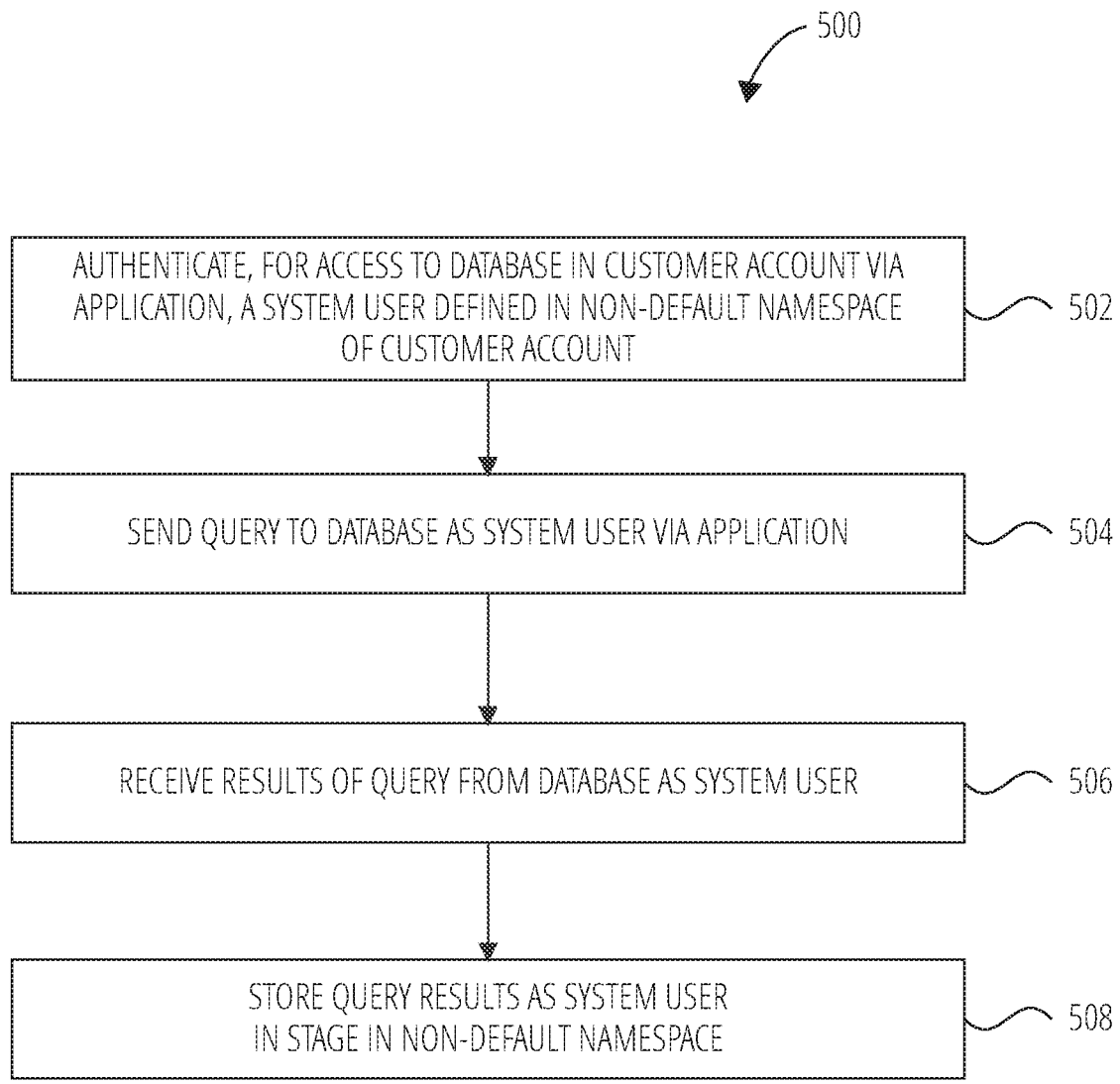
FIG. 5 illustrates a second example method, in accordance with at least one embodiment.

As discussed here in connection with FIG. 5, the application 112 may use the aforementioned system user that was provisioned in the application namespace 204 to access the data of the customer account 200 on the database platform 100. This may be thought of as the application 112 accessing the database platform 100 as itself. FIG. 5 illustrates an example method 500, in accordance with at least one embodiment. In various different embodiments, the method 500 could be performed by any computing and communication device or system of such devices that is suitably equipped, programmed, and configured to perform the operations described herein. In at least one embodiment, the method 500 is performed by one or more processors. In some embodiments, all or part of the method 500 is performed by the database manager 104, which may involve one or more aspects of the method 500 being performed by the resource manager 106, one or more aspects of the method 500 being performed by the execution platform 108, and/or one or more aspects of the method 500 being performed by one or more other functional components of the database manager 104. By way of example and not limitation, the method 500 is described below as being performed by the database manager 104, and this description makes reference by way of example to other elements depicted in one or more of the other figures.

At operation 502, the database manager 104 authenticates the system user for access via the application 112 to a database associated with the customer account 200 of the database platform 100. The system user may be a programmatic user that is not associated with a user account of the customer account 200. As described above, in at least one embodiment, the system user is defined as one of the application-namespace objects 208 in the application namespace 204 in the customer account 200. As also described above, the application namespace 204 is distinct from the default namespace 202. Credentials may have been provisioned for the system user, and the system user may use those credentials to open a session via the application 112 with the database platform 100. That session may be created by way of a 2-legged authentication flow using, e.g., OAuth. In an embodiment, application 112 uses the system user's identity to connect to the database platform 100. An example authentication flow may include the application 112 providing its credentials (e.g., application-client identifier (e.g., username) and secret (e.g., password)) to the database platform 100, which may then return an access token (e.g., an OAuth Access Token) to the application 112. The application 112 may then use that access token when opening a connection with the database platform 100, which may return a session token to the application 112. That session token may have the identity of the system user embedded therein. The application 112 may then conduct the session using the issued session token.

In at least one embodiment, following that authentication flow, the system user is then able to perform one or more database operations directly on the data maintained for the customer account 200 at the database platform 100. These database operations could include running queries, receiving results, downloading results of queries performed by other users, and/or the like. The session may be bound to the system user and therefore to the application namespace 204. In instances in which the system user is defined in another namespace such as the default namespace 202 or a different namespace, the session may be bound to the namespace in which the system user is defined. As described above, in some embodiments, the application-namespace objects 208 in the application namespace 204 are not visible to the default-namespace objects 206 in the default namespace 202.

At operation 504, the database manager 104 sends, as the system user via the application 112, a query to the database that is associated in the database platform 100 with the customer account 200. At operation 506, the database manager 104 receives, as the system user, results of the query from the database. At operation 508, the database manager 104 stores, as the system user, the results of the query in a stage in the application namespace 204. That is, in this example, the stage is one of the application-namespace objects 208 in the application namespace 204. In various different embodiments, the database manager 104 may conduct, as the system user, a database session with respect to a database associated with the customer account 200. Within such a database session, the system user may conduct one or more database transactions on the database, where the one or more database transactions include storing data, causing ingestion of data, removing data, modifying data, inserting data, running one or more queries on the data (such as the query of operation 504, operation 506, and operation 508, for example), creating one or more materialized views, and/or the like.

In some cases, after a human user (or any other user such as another system user) performs a given query and receives results, the system user may detect (e.g., may be notified by the database platform 100, or may poll for such events, and/or the like) that a user account associated with that other user has been used to perform that query and receive query results of that query. Upon making this detection, the system user may open a session, download those same results, and store them in a stage in the application namespace 204. The system user may, depending on the role granted to it and the privileges granted to that role, be able to create and/or modify the schema of tables, tasks, stored procedures, and/or one or more other of the application-namespace objects 208 in the application namespace 204 in the customer account 200.

In some embodiments, there is only one type of user object, and both human users and system users are instances of that single type of user object. In other embodiments, there are different user-object types for human users and system (e.g., app-instance) users. A system user may also be able to request a URI, for a given stage in the customer account 200, and then use that URL to access the given stage and store data there. The data that the system user stores in one or more stages in the application namespace 204 may be made accessible to one or more human users via a dashboard in the application 112. In some cases, the system user may run one or more queries (that, e.g., take a long time) overnight, store the results of such one or more queries in, e.g., a stage in the application namespace 204, and provide access to those results (e.g., make those results available) via an interface such as the aforementioned dashboard. As described above, in some embodiments, the system user may have had the app-admin role granted to it, and that role may not be owned by an administrative role of the customer account 200.

Moreover, as mentioned above, in addition to provisioning applications, the herein-disclosed application-provisioning framework can be used for other application-related functions such as deprovisioning, updating, upgrading, uninstalling, enabling, disabling, and/or the like. Disabling an application may keep the provisioned application footprint but place the application 112 in a disabled state, whereas deprovisioning may remove the provisioned application footprint. Updating to a newer version of the application 112 could include modifying, creating, and/or deleting database objects as dictated by the newer version of the application 112. Moreover, it is contemplated that different versions of an application might run in different deployments or in the same deployment, if, e.g., some customers did not update their applications. For an update operation, a blueprint document may specify the currently provisioned version of the application, a new version of the application to be provisioned, one or more security-upgrade instructions, and/or one or more application-database-upgrade instructions, the latter two of which could be JSON arrays.

Furthermore, it may be the case that multiple instances of a database platform are executing in various different locations. Thus, as one example, the database platform 100 could be associated with the western United States while a second database platform may be configured to serve the eastern United States. In such a context, if the database platform 100 (e.g., the application-provisioning framework 110) provisioned the application 112 for the customer account 200 as described herein, this provisioning may then be programmatically replicated to the second database platform. Once the provisioning in and by the database platform 100 is complete, the application-provisioning framework 110 may transmit a replication instruction to a corresponding application-provisioning framework in the second database platform. This replication instruction (or set of instructions) may convey the steps (in, e.g., a copy of the application-provisioning blueprint document 400) for the second database platform to take in order to provision the application 112 in an application infrastructure that is associated with the second database platform. Thus, once deployed in one infrastructure, all provisioned objects can be replicated in another infrastructure so as to have global availability. Any modifications (e.g., upgrades, removals, and/or the like) that are made to either instance of the application 112 could then be propagated to the other instance. And certainly this approach is extensible to more than two instances of provisioning the application 112 for a given database platform.

Figure 6:
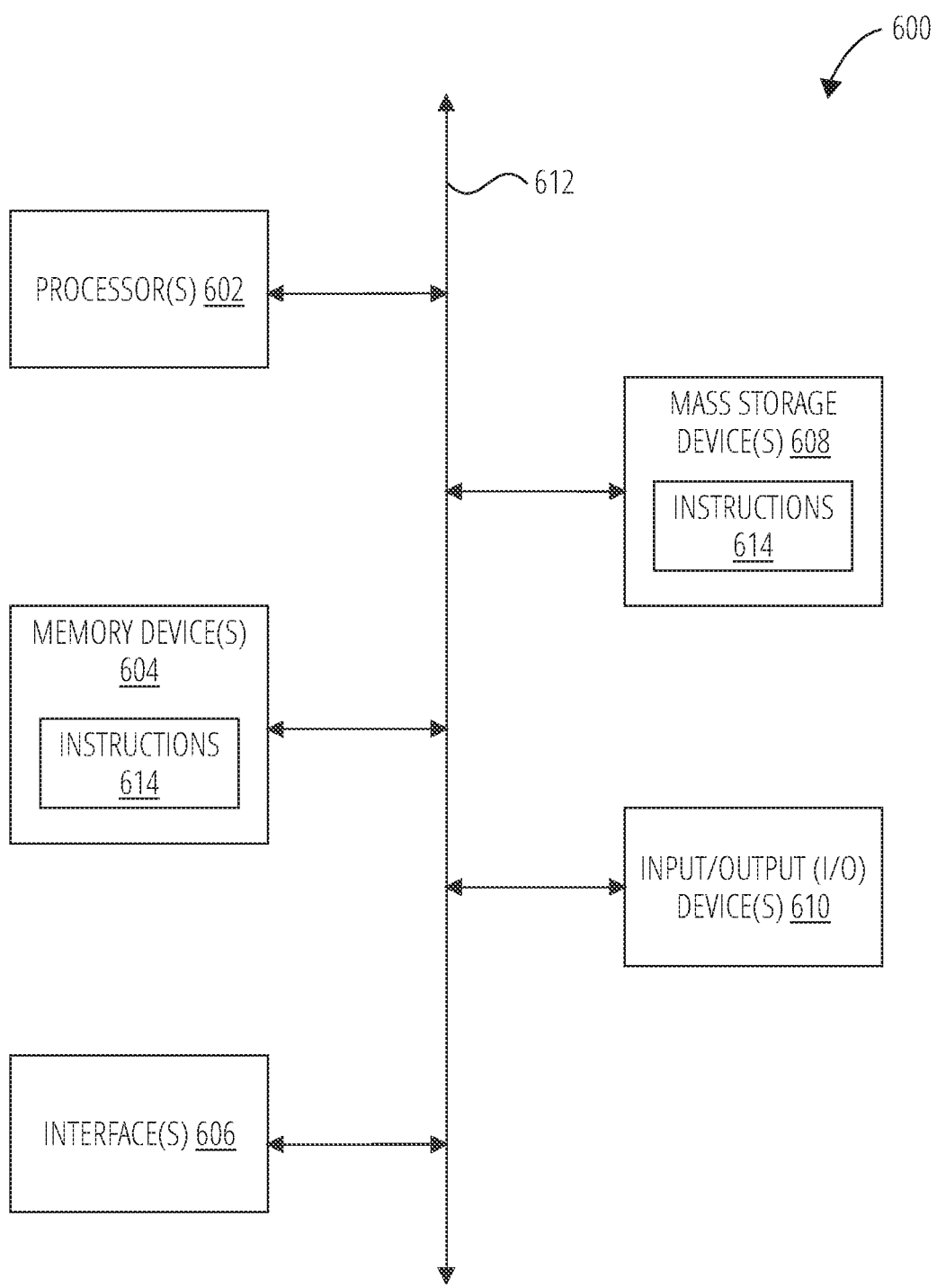
FIG. 6 illustrates an example computing device, in accordance with at least one embodiment.

FIG. 6 illustrates an example computing device 600, in accordance with at least one embodiment. In some embodiments, the computing device 600 is used to implement one or more of the systems and components discussed herein. Further, the computing device 600 may interact with any of the systems and components described herein. Accordingly, the computing device 600 may be used to perform various procedures and tasks, such as those discussed herein. The computing device 600 can function as a server, a client, or any other computing entity. The computing device 600 can be any of a wide variety of computing devices, such as a desktop computer, a notebook computer, a server computer, a handheld computer, a mobile device, a tablet, and/or the like.

In the depicted embodiment, the computing device 600 includes one or more processor(s) 602, one or more memory device(s) 604, one or more interface(s) 606, one or more mass storage device(s) 608, and one or more input/output device(s) 610, all of which are coupled to a bus 612. The processor(s) 602 include one or more processors or controllers that execute instructions 614 stored in the memory device(s) 604 and/or the mass storage device(s) 608.

The memory device(s) 604 can include various computer-storage media, such as volatile memory (e.g., random access memory (RAM)) and/or nonvolatile memory (e.g., read-only memory (ROM)). The memory device(s) 604 may also include rewritable ROM, such as Flash memory. The processor(s) 602 may also include various types of computer-storage media, such as cache memory.

The interface(s) 606 may include various interfaces that allow the computing device 600 to interact with other systems, devices, computing environments, and/or the like. Example interface(s) 606 include any number of different network interfaces, such as interfaces to local area networks (LANs), wide area networks (WANs), wireless networks, the Internet, and/or the like.

The mass storage device(s) 608 may include various computer-storage media, such as magnetic tapes, magnetic disks, optical disks, solid-state memory (e.g., Flash memory), and so forth. Various drives may also be included in the mass storage device(s) 608 to enable reading from and/or writing to the various computer-storage media. The mass storage device(s) 608 may include removable media and/or non-removable media.

The input/output device(s) 610 may include various devices that allow data and/or other information to be input to and/or retrieved from the computing device 600. Example input/output device(s) 610 include cursor-control devices, keyboards, keypads, microphones, monitors or other display devices, speakers, printers, network interface cards, modems, lenses, charged coupled devices (CCDs) or other image-capture devices, and the like.

The bus 612 allows the processor(s) 602, the memory device(s) 604, the interface(s) 606, the mass storage device(s) 608, and the input/output device(s) 610 to communicate with one another, as well as with other devices or components that may be coupled to the bus 612. The bus 612 represents one or more of several types of bus structures, such as a system bus, a Peripheral Component Interconnect (PCI) bus, an institute of Electrical and Electronics Engineers (IEEE) 1394 bus, a Universal Serial Bus (USB) bus, and/or the like. In some examples, the bus 612 includes one or more network connections.

For purposes of illustration, programs and other executable program components are shown herein as discrete blocks, although it is understood that such programs and components may reside at various times in different storage components of the computing device 600 and are executed by the processor(s) 602. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

Executable Instructions and Computer-Storage Medium/Media

The various memories may store one or more sets of instructions 614 and data structures (e.g., software) embodying or utilized by any one or more of the methodologies or functions described herein. These instructions 614, when executed by the processor(s) 602, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and compact disk (CD) ROM (CD-ROM) and Digital Versatile Disk (DVD) ROM (DVD-ROM) disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

Transmission Medium/Media

In various example embodiments, any network or portion of a network described herein may be an ad hoc network, an intranet, an extranet, a virtual private network (VPN), a local area network (LAN), a wireless LAN (WLAN), a wide area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and a utilized coupling may be a Code Division Multiple Access (CDMA) connection, a Global System for Mobile communications (GSM) connection, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 614 may be transmitted or received over a network using a transmission medium via a network interface device (e.g., a network interface component) and utilizing any one of a number of well-known transfer protocols (e.g., hypertext transfer protocol (HTTP)). Similarly, the instructions 614 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 614 for execution by the computing device 600, and include digital or analog communications signals or other intangible media to facilitate communication of such software. Hence, the terms "transmission medium (and media)" and "signal medium and media)" shall be taken to include any form of modulated data signal, carrier wave, and so forth. The term "modulated data signal" means a signal that has one or more of its characteristics set or changed in such a manner as to encode information in the signal.

Computer-Readable Medium/Media

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

Examples of Embodiments

Following is a list of some examples of embodiments.

Example 1 is a method that includes receiving, by one or more processors, a provisioning request from a requesting entity, the provisioning request requesting provisioning of an application for a customer account of a database platform; retrieving, by the one or more processors, an application-provisioning blueprint document from data storage in response to receiving the provisioning request, the application-provisioning blueprint document listing one or more database objects; and provisioning, by the one or more processors and according to the retrieved application-provisioning blueprint document, the one or more listed database objects in the customer account.

Example 2 is the method of Example 1, where the requesting entity is a user account that is associated with the customer account.

Example 3 is the method of Example 1, where the requesting entity is an executing process.

Example 4 is the method of Example 1, where the requesting entity is a system instance of the application, the system instance of the application executing in an administrative account of the database platform.

Example 5 is the method of any of the Examples 1-4, further including, prior to provisioning the one or more listed database objects: generating a script including one or more grant commands associated with the provisioning; transmitting the script to an authorized entity; and receiving an indication from the requesting entity that the one or more grant commands have been executed.

Example 6 is the method of any of the Examples 1-5, where the one or more database objects include a system user; and the method further includes connecting, by the provisioned application, to the database platform as the system user; and performing, by the provisioned application, one or more database operations on data in the customer account as the system user.

Example 7 is the method of any of the Examples 1-6, where provisioning the one or more listed database objects includes provisioning the one or more listed database objects in an application namespace that is separate from a default namespace of the customer account, the default namespace including one or more default-namespace objects.

Example 8 is the method of Example 7, where the application namespace is not visible to the one or more default-namespace objects in the default namespace.

Example 9 is the method of any of the Examples 1-8, where the application resides as an application instance on an application infrastructure that is separate from an infrastructure of the database platform; and the method further includes transmitting application-provisioning data associated with the customer account to the application instance on the application infrastructure.

Example 10 is the method of any of the Examples 1-9, where the application-provisioning blueprint document listing the one or more database objects includes the application-provisioning blueprint document including one or more executable instructions, the one or more executable instructions specifying the one or more database objects; and provisioning the one or more listed database objects according to the retrieved application-provisioning blueprint document includes executing the one or more executable instructions.

Example 11 is a database platform including at least one processor; and one or more computer-storage media containing instructions executable by the at least one processor for causing the at least one processor to perform operations including receiving a provisioning request from a requesting entity, the provisioning request requesting provisioning of an application for a customer account of the database platform; retrieving an application-provisioning blueprint document from data storage in response to receiving the provisioning request, the application-provisioning blueprint document listing one or more database objects; and provisioning, according to the retrieved application-provisioning blueprint document, the one or more listed database objects in the customer account.

Example 12 is the database platform of Example 11, where the requesting entity is a user account that is associated with the customer account.

Example 13 is the database platform of Example 11, where the requesting entity is an executing process.

Example 14 is the database platform of Example 11, where the requesting entity is a system instance of the application, the system instance of the application executing in an administrative account of the database platform.

Example 15 is the database platform of any of the Examples 11-14, the operations further including, prior to provisioning the one or more listed database objects: generating a script including one or more grant commands associated with the provisioning; transmitting the script to an authorized entity; and receiving an indication from the requesting entity that the one or more grant commands have been executed.

Example 16 is the database platform of any of the Examples 11-15, where the one or more database objects include a system user; and the operations further include connecting, by the provisioned application, to the database platform as the system user; and performing, by the provisioned application, one or more database operations on data in the customer account as the system user.

Example 17 is the database platform of any of the Examples 11-16, where provisioning the one or more listed database objects includes provisioning the one or more listed database objects in an application namespace that is separate from a default namespace of the customer account, the default namespace including one or more default-namespace objects.

Example 18 is the database platform of Example 17, where the application namespace is not visible to the one or more default-namespace objects in the default namespace.

Example 19 is the database platform of any of the Examples 11-18, where the application resides as an application instance on an application infrastructure that is separate from an infrastructure of the database platform; and the operations further include transmitting application-provisioning data associated with the customer account to the application instance on the application infrastructure.

Example 20 is the database platform of any of the Examples 11-19, where the application-provisioning blueprint document listing the one or more database objects includes the application-provisioning blueprint document including one or more executable instructions, the one or more executable instructions specifying the one or more database objects; and provisioning the one or more listed database objects according to the retrieved application-provisioning blueprint document includes executing the one or more executable instructions.

Example 21 is one or more computer-storage media containing instructions executable by at least one processor of a database platform for causing the at least one processor to perform operations including receiving a provisioning request from a requesting entity, the provisioning request requesting provisioning of an application for a customer account of the database platform; retrieving an application-provisioning blueprint document from data storage in response to receiving the provisioning request, the application-provisioning blueprint document listing one or more database objects; and provisioning, according to the retrieved application-provisioning blueprint document, the one or more listed database objects in the customer account.

Example 22 is the one or more computer-storage media of Example 21, where the requesting entity is a user account that is associated with the customer account.

Example 23 is the one or more computer-storage media of Example 21, where the requesting entity is an executing process.

Example 24 is the one or more computer-storage media of Example 21, where the requesting entity is a system instance of the application, the system instance of the application executing in an administrative account of the database platform.

Example 25 is the one or more computer-storage media of any of the Examples 21-24, the operations further including, prior to provisioning the one or more listed database objects: generating a script including one or more grant commands associated with the provisioning; transmitting the script to an authorized entity; and receiving an indication from the requesting entity that the one or more grant commands have been executed.

Example 26 is the one or more computer-storage media of any of the Examples 21-25, where the one or more database objects include a system user; and the operations further include connecting, by the provisioned application, to the database platform as the system user; and performing, by the provisioned application, one or more database operations on data in the customer account as the system user.

Example 27 is the one or more computer-storage media of any of the Examples 21-26, where provisioning the one or more listed database objects includes provisioning the one or more listed database objects in an application namespace that is separate from a default namespace of the customer account, the default namespace including one or more default-namespace objects.

Example 28 is the one or more computer-storage media of Example 27, where the application namespace is not visible to the one or more default-namespace objects in the default namespace.

Example 29 is the one or more computer-storage media of any of the Examples 21-28, where the application resides as an application instance on an application infrastructure that is separate from an infrastructure of the database platform; and the operations further include transmitting application-provisioning data associated with the customer account to the application instance on the application infrastructure.

Example 30 is the one or more computer-storage media of any of the Examples 21-29, where the application-provisioning blueprint document listing the one or more database objects includes the application-provisioning blueprint document including one or more executable instructions, the one or more executable instructions specifying the one or more database objects; and provisioning the one or more listed database objects according to the retrieved application-provisioning blueprint document includes executing the one or more executable instructions.

CONCLUSION

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method performed by a cloud-based platform executing instructions using at least one hardware processor, the method comprising:

receiving, at the cloud-based platform, an application-provisioning request from a client that is remote to the cloud-based platform, the client being operated by a client user having a customer account with the cloud-based platform, the application-provisioning request requesting that an instance of an application be provided access to customer data hosted by a remote storage platform, the instance being hosted on an application server that is separate from and independent of the cloud-based platform, of the remote storage platform, and of the client, and the remote storage platform being separate from and independent of the cloud-based platform and the client; and in response to receiving the application-provisioning request, the cloud based platform performing steps of:
  accessing, from a plurality of application-provisioning blueprint documents for a plurality of different applications, a blueprint document that corresponds to the application, the blueprint document specifying a dedicated application namespace for use with the instance that is distinct from a default namespace of the customer account and including a set of instructions for creating one or more database objects in the dedicated application namespace, the one or more database objects including a user object that stores credentials for a programmatic user of the cloud-based platform not associated with the client user of the customer account, the programmatic user being authorized to access the customer data on the remote storage platform while the client user is not authorized to access the customer data on the remote storage platform, the user object being configured to be used by the instance to conduct a database session with the remote storage platform for the access of the customer data by the programmatic user;
  executing, by the cloud-based platform, the set of instructions included in the blueprint document, the executing causing the user object to be created at the cloud-based platform in the dedicated application namespace, the programmatic user to be created in the dedicated application namespace, and an account on the remote storage platform to be created using the credentials, the credentials to be provided by the user object to the programmatic user for logging into the remote storage platform;
  subsequently receiving, by the cloud-based platform, a data request from the instance that requests access to the customer data; and
  in response to the data request:
    authenticating the programmatic user with the account on the remote storage platform using the credentials provided by the user object; and
    after the programmatic user is authenticated:
      sending, by the programmatic user, a query to the remote storage platform to access at least a portion of the customer data based on the data request;
      receiving, by the programmatic user, a result from the remote storage platform in response to the query;
      storing the result in the dedicated application namespace; and
      providing, from the dedicated application namespace, the accessed customer data to the instance by returning the result to the instance.

2. The method of claim 1, wherein the client is associated with a user account of the customer account.

3. The method of claim 1, wherein:
  the cloud-based platform receives the application-provisioning request from the client via a first communication path;
  the cloud-based platform communicates with the instance via a second communication path;
  the cloud-based platform receives the data request via the second communication path; and
  the cloud-based platform provides the accessed customer data to the instance via the second communication path.

4. The method of claim 1, wherein the client is associated with an administrative account of the cloud-based platform.

5. The method of claim 1, further comprising, prior to creating the one or more database objects in the dedicated application namespace:
  generating a script comprising one or more grant commands associated with the application-provisioning request;
  transmitting the script to an authorized entity; and
  receiving an indication from the authorized entity that the one or more grant commands have been executed.

6. The method of claim 1, wherein the default namespace comprises one or more default-namespace objects.

7. The method of claim 6, wherein the dedicated application namespace is not visible to the one or more default-namespace objects in the default namespace.

8. The method of claim 1, further comprising transmitting application-provisioning data associated with the customer account to the instance on the application server.

9. A cloud-based platform comprising:
  at least one hardware processor; and
  one or more computer-storage media containing instructions that, when executed by the at least one hardware processor, cause the cloud-based platform to perform operations comprising:
    receiving, the cloud-based platform, an application-provisioning request from a client that is remote to the cloud-based platform, the client being operated by a client user having a customer account with the cloud-based platform, the application-provisioning request requesting that an instance of an application be provided access to customer data hosted by a remote storage platform, the instance being hosted on an application server that is separate from and independent of the cloud-based platform, of the remote storage platform, and of the client, and the remote storage platform being separate from and independent of the cloud-based platform and the client; and
    in response to receiving the application-provisioning request, the cloud based platform performing steps of:
      accessing, from a plurality of application-provisioning blueprint documents for a plurality of different applications, a blueprint document that corresponds to the application, the blueprint document specifying a dedicated application namespace for use with the instance that is distinct from a default namespace of the customer account and including a set of instructions for creating one or more database objects in the dedicated application namespace, the one or more database objects including a user object that stores credentials for a programmatic user of the cloud-based platform not associated with the client user of the customer account, the programmatic user being authorized to access the customer data on the remote storage platform while the client user is not authorized to access the customer data on the remote storage platform, the user object being configured to be used by the instance to conduct a database session with the remote storage platform for the access of the customer data by the programmatic user;

executing, by the cloud-based platform, the set of instructions included in the blueprint document, the executing causing the user object to be created at the cloud-based platform in the dedicated application namespace, the programmatic user to be created in the dedicated application namespace, and an account on the remote storage platform to be created using the credentials, the credentials to be provided by the user object to the programmatic user for logging into the remote storage platform;

subsequently receiving, by the cloud-based platform, a data request from the instance that requests access to the customer data; and in response to the data request:
authenticating the programmatic user with the account on the remote storage platform using the credentials provided by the user object; and
after the programmatic user is authenticated:
sending, by the programmatic user, a query to the remote storage platform to access at least a portion of the customer data based on the data request;
receiving, by the programmatic user, a result from the remote storage platform in response to the query;
storing the result in the dedicated application namespace; and
providing, from the dedicated application namespace, the accessed customer data to the instance by returning the result to the instance.

10. The cloud-based platform of claim 9, wherein the client is associated with a user account of the customer account.

11. The cloud-based platform of claim 9, wherein:
the cloud-based platform receives the application-provisioning request from the client via a first communication path;
the cloud-based platform communicates with the instance via a second communication path;
the cloud-based platform receives the data request from the customer account via the second communication path; and
the cloud-based platform provides the accessed customer data to the instance via the second communication path.

12. The cloud-based platform of claim 9, wherein the client is associated with an administrative account of the cloud-based platform.

13. The cloud-based database platform of claim 9, wherein executing the set of instructions included in the blueprint document comprises:
generating a script comprising one or more grant commands;
transmitting the script to an authorized entity; and
receiving an indication from the authorized entity that the one or more grant commands have been executed.

14. The cloud-based platform of claim 9, wherein the default namespace comprises one or more default-namespace objects.

15. The cloud-based platform of claim 14, wherein the dedicated application namespace is not visible to the one or more default-namespace objects in the default namespace.

16. The cloud-based platform of claim 9, the operations further comprising transmitting application-provisioning data associated with the customer account to the instance on the application server.

17. One or more computer-storage media containing instructions that, when executed by at least one hardware processor of a cloud-based platform, cause the cloud-based platform to perform operations comprising:

receiving, the cloud-based platform, an application-provisioning request from a client that is remote to the cloud-based platform, the client being operated by a client user having a customer account with the cloud-based platform, the application-provisioning request requesting that an instance of an application be provided access to customer data hosted by a remote storage platform, the instance being hosted on an application server that is separate from and independent of the cloud-based platform, of the remote storage platform, and of the client, and the remote storage platform being separate from and independent of the cloud-based platform and the client; and in response to receiving the application-provisioning request, the cloud based platform performing steps of:
accessing, from a plurality of application-provisioning blueprint documents for a plurality of different applications, a blueprint document that corresponds to the application, the blueprint document specifying a dedicated application namespace for use with the instance that is distinct from a default namespace of the customer account and including a set of instructions for creating one or more database objects in the dedicated application namespace, the one or more database objects including a user object that stores credentials for a programmatic user of the cloud-based platform not associated with the client user of the customer account, the programmatic user being authorized to access the customer data on the remote storage platform while the client user is not authorized to access the customer data on the remote storage platform, the user object being configured to be used by the instance to conduct a database session with the remote storage platform for the access of the customer data by the programmatic user;

executing, by the cloud-based platform, the set of instructions included in the blueprint document, the executing causing the user object to be created at the cloud-based platform in the dedicated application namespace, the programmatic user to be created in the dedicated application namespace, and an account on the remote storage platform to be created using the credentials, the credentials to be provided by the user object to the programmatic user for logging into the remote storage platform;

subsequently receiving, by the cloud-based platform, a data request from the instance that requests access to the customer data; and in response to the data request:
authenticating the programmatic user with the account on the remote storage platform using the credentials provided by the user object; and after the programmatic user is authenticated:
sending, by the programmatic user, a query to the remote storage platform to access at least a portion of the customer data based on the data request;
receiving, by the programmatic user, a result from the remote storage platform in response to the query;
storing the result in the dedicated application namespace; and
providing, from the dedicated application namespace, the accessed customer data to the instance by returning the result to the instance.

18. The one or more computer-storage media of claim 17, wherein the client is associated with a user account of the customer account.

19. The one or more computer-storage media of claim 17, wherein:
the cloud-based platform receives the application-provisioning request from the client via a first communication path;
the cloud-based platform communicates with the instance via a second communication path;
the cloud-based platform receives the data request via the second communication path; and
the cloud-based platform provides the accessed customer data to the instance via the second communication path.

20. The one or more computer-storage media of claim 17, wherein the client is associated with an administrative account of the cloud-based platform.

21. The one or more computer-storage media of claim 17, wherein executing the set of instructions included in the blueprint document comprises:
generating a script comprising one or more grant commands;
transmitting the script to an authorized entity; and
receiving an indication from the authorized entity that the one or more grant commands have been executed.

22. The one or more computer-storage media of claim 17, wherein the default namespace comprises one or more default-namespace objects.

23. The one or more computer-storage media of claim 22, wherein the dedicated application namespace is not visible to the one or more default-namespace objects in the default namespace.

24. The one or more computer-storage media of claim 17, the operations further comprising transmitting application-provisioning data associated with the customer account to the instance on the application server.

* * * * *

UNITED STATES PATENT AND TRADEMARK OFFICE
CERTIFICATE OF CORRECTION

PATENT NO. : 11,501,010 B2
APPLICATION NO. : 16/883565
DATED : November 15, 2022
INVENTOR(S) : Acharya et al.

It is certified that error appears in the above-identified patent and that said Letters Patent is hereby corrected as shown below:

In the Claims

In Column 29, Lines 48-49, in Claim 11, after "request", delete "from the customer account"

In Column 29, Line 57, in Claim 13, after "cloud-based", delete "database"

Signed and Sealed this
Twelfth Day of September, 2023

Katherine Kelly Vidal
*Director of the United States Patent and Trademark Office*